US007433720B2

(12) United States Patent
Seol

(10) Patent No.: US 7,433,720 B2
(45) Date of Patent: Oct. 7, 2008

(54) BUILT-IN ANTENNA APPARATUS OF PORTABLE WIRELESS TERMINAL

(75) Inventor: Dong-Beom Seol, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 494 days.

(21) Appl. No.: 11/283,625

(22) Filed: Nov. 21, 2005

(65) Prior Publication Data

US 2006/0111075 A1 May 25, 2006

(30) Foreign Application Priority Data

Nov. 24, 2004 (KR) ..................... 10-2004-0096693

(51) Int. Cl.
*H04B 1/38* (2006.01)

(52) U.S. Cl. .................. 455/575.1; 455/90.3; 455/351; 343/702

(58) Field of Classification Search ....................... None
See application file for complete search history.

(56) References Cited

U.S. PATENT DOCUMENTS 5,020,136 A * 5/1991 Patsiokas et al. ............ 455/351
5,408,699 A * 4/1995 Yamashita et al. .......... 455/347
6,944,429 B1 * 9/2005 Kitamura et al. ........... 455/90.3

FOREIGN PATENT DOCUMENTS

| | | |
|---|---|---|
| DE | 198 24 145 | 5/1998 |
| EP | 0 339 628 | 4/1989 |
| EP | 1 052 723 | 11/2000 |
| KR | 10-2001-0044821 | 6/2001 |
| WO | WO 03/009417 | 1/2003 |

* cited by examiner

*Primary Examiner*—Thanh C Le
(74) *Attorney, Agent, or Firm*—The Farrell Law Firm, PC

(57) ABSTRACT

A portable wireless terminal with a main body having a main board, and a battery pack detachably mounted in the main body and used as power supply means for the terminal, wherein the battery pack includes an upper case frame; a lower case frame coupled with the upper case frame to provide a predetermined installation space therebetween; a battery cell having a conductive outer surface fixed on the installation space; and a radiator fixed to an inner surface of the upper case frame, and having a feed pin and a ground pin that are exposed on the lower case frame along a detour route around the battery cell. Since the radiator is not installed inside the main body but inside the battery pack, an antenna mounting space can be removed from the main body, which contributes to a slim profile and a lightweight feature of the wireless terminal.

14 Claims, 7 Drawing Sheets

BUILT-IN ANTENNA APPARATUS OF PORTABLE WIRELESS TERMINAL

PRIORITY

This application claims priority under 35 U.S.C. § 119 to an application entitled "Built-in Antenna Module For Portable Wireless Terminal" filed in the Korean Intellectual Property Office on Nov. 24, 2004 and assigned Serial No. 2004-96693 the contents of which are incorporated herein by reference.

BACKGROUND OF THE INVENTION

1. Field of the Invention

The present invention relates to a portable wireless terminal having a built-in antenna module, and more particularly, to a built-in antenna apparatus for a portable wireless terminal, which is designed with a planar inverted-F antenna (PIFA) and contributes to a slim and lightweight profile of the wireless terminal.

2. Background of the Prior Art

Recently, as portable wireless terminals, such as cellular phones, wireless notebooks, and terminals for a Personal Communication System (PCS), Digital Cellular System (DCS), Global Positioning System (GPS) and Personal Digital Assistant (PDA), have become increasingly popular, terminals with various new functions and designs have been introduced. The terminals are developed with small-sized, slim, and lightweight features in mind and at the same time are focused on providing a variety of functions to satisfy popular demand. Therefore, the design objectives for the terminals are focused on volume reduction while maintaining or improving the functionality.

Today, rod antennas (also known as whip antennas) and helical antennas are widely used, owing to their good omnidirectional properties. However, the rod antenna and the helical antenna, which protrude outward from the terminal, are easy to break when dropped. These factors degrade the external appearance and limit the portability of the terminal. Therefore, an antenna installed within the terminal (called a built-in antenna, an internal antenna, or an antenna) has had widespread use in recent times. Various efforts are being made to improve the performance and productivity of the built-in antenna. There are two types of built-in antennas in common use: a planar inverted F antenna (PIFA) module having a feed point and a ground point; and a chip antenna module, suitable for mounting on a ceramic dielectric substance and having a copper coil whose turns are adjusted according to the operating frequency of the terminal.

FIG. 1 is a perspective view of a prior art portable wireless terminal 100 and shows a slide type portable wireless terminal. Although the prior art exemplarily shows the slide type portable wireless terminal, it is not limited thereto but may be applied to a variety of terminals with a built-in antenna (e.g., a folder type terminal, a bar type terminal, a flip type terminal).

Referring to FIG. 1, the portable wireless terminal 100 includes a main body 110 and a slide body 120, which is slidable in a lengthwise direction of the wireless terminal 100 by a predetermined length. The slide body 120 is provided on a front side thereof with a display device 121. The display device 121 may be a color wide Liquid Crystal Display (LCD) module, preferably a touch screen panel. The display device 121 also includes a speakerphone device 122 installed at an upper side thereof, and at least one keypad assembly 123 installed at a lower side thereof. Preferably, the keypad assembly may include a navigation key button.

When the slide body 120 is opened on the main body 110, another keypad assembly 111 having a plurality of key buttons, preferably digital key buttons (in a 3×4 matrix), is exposed. In addition, another microphone device 112 is located at a lower side of the keypad assembly 111.

FIG. 2 is a rear perspective view of a prior art portable wireless terminal and shows the position of a radiator of a built-in antenna. Referring to FIG. 2, a battery pack serving as power supply means is installed on a rear surface 130 of the main body 110. In the conventional arrangement, the built-in antenna is installed inside the main body 110, as is indicated by a dotted line. In more detail, a plate type radiator is mounted at a predetermined height on a main board installed inside the main body 110. When the radiator is a PIFA type radiator having a dipole structure, it has a feed part and a ground part. The feed part is electrically connected to an RF connector of the main board and the ground part is electrically connected to a ground pattern formed on the main board. Accordingly, the radiator is fixed using an antenna carrier, or similar device, because the PIFA type radiator must be spaced apart from the main board a predetermined distance between the radiator and the main board.

However, when the antenna apparatus is installed inside the main body like in the prior art, the additional installation space of the antenna results in an increase in the volume of the terminal.

SUMMARY OF THE INVENTION

The present invention provides a portable wireless terminal having a built-in antenna which is designed to deliver a maximum antenna performance without increasing the volume of the wireless terminal.

The present invention also provides a built-in antenna apparatus of a portable wireless terminal, which is designed so as to not require a separate ground means.

Further, the present invention provides a built-in antenna apparatus of a portable wireless terminal which is designed to satisfy consumer demand by enhancing the performance of an antenna and at the same time decreasing the volume of the wireless terminal.

According to an aspect of the present invention, a portable wireless terminal is provided with a main body having a main board, and a battery pack detachably mounted in the main body and used as power supply means for the terminal. The battery pack includes an upper case frame; a lower case frame coupled with the upper case frame to provide a predetermined installation space therebetween; a battery cell having a conductive outer surface fixed on the installation space; and a radiator fixed to an inner surface of the upper case frame, and having a feed pin and a ground pin that are exposed on the lower case frame along a detour route around the battery cell.

According to the present invention, the radiator is installed not inside the main body but inside the case frame constituting the battery pack. Accordingly, a space for the installation of the radiator is removed from the main body, so that it becomes possible to remarkably reduce the volume of the wireless terminal.

Preferably, since the radiator is installed inside the case frame constituting the battery pack and a metallic outer surface of the battery cell is used as a ground surface, the built-in antenna apparatus does not need a separate ground means. However, it is permitted to use a ground pattern formed on a conventional main board.

According to the present invention, the radiator is designed to receive current and be grounded as soon as the battery pack is installed at the main body and power is supplied. Accordingly, the radiator may be designed to receive current or be grounded when the battery pack is installed in the terminal. A mechanical construction for the current feed or ground may be embodied by a variety of connector means well known, for example, a spring type connector or a pin spring type connector including a ball plunger.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Also, when it is determined that the subject of the invention may be ambiguous by a detailed description, the detailed description will be omitted.

Figure 1:
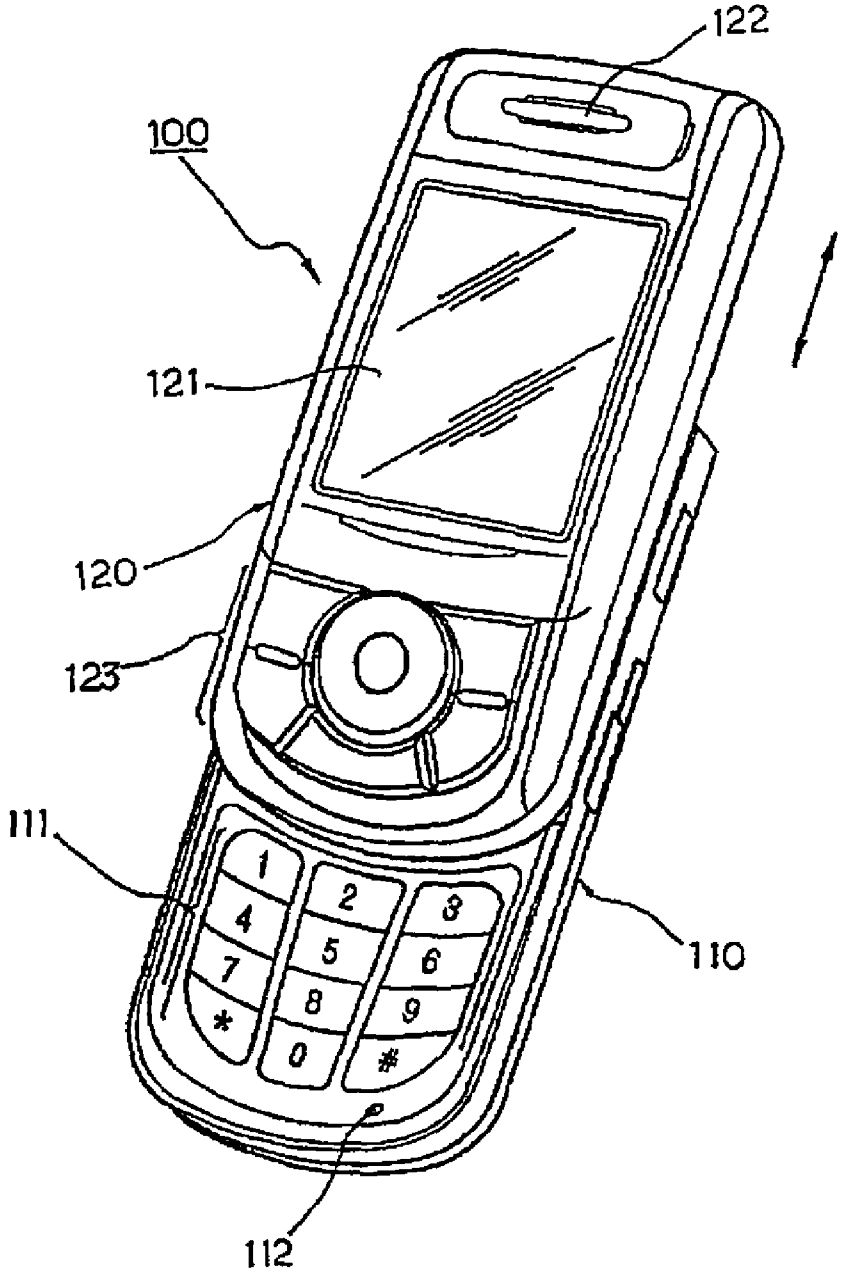
FIG. 1 PRIOR ART
FIG. 1 is a perspective view of a conventional portable wireless terminal.
Figure 2:
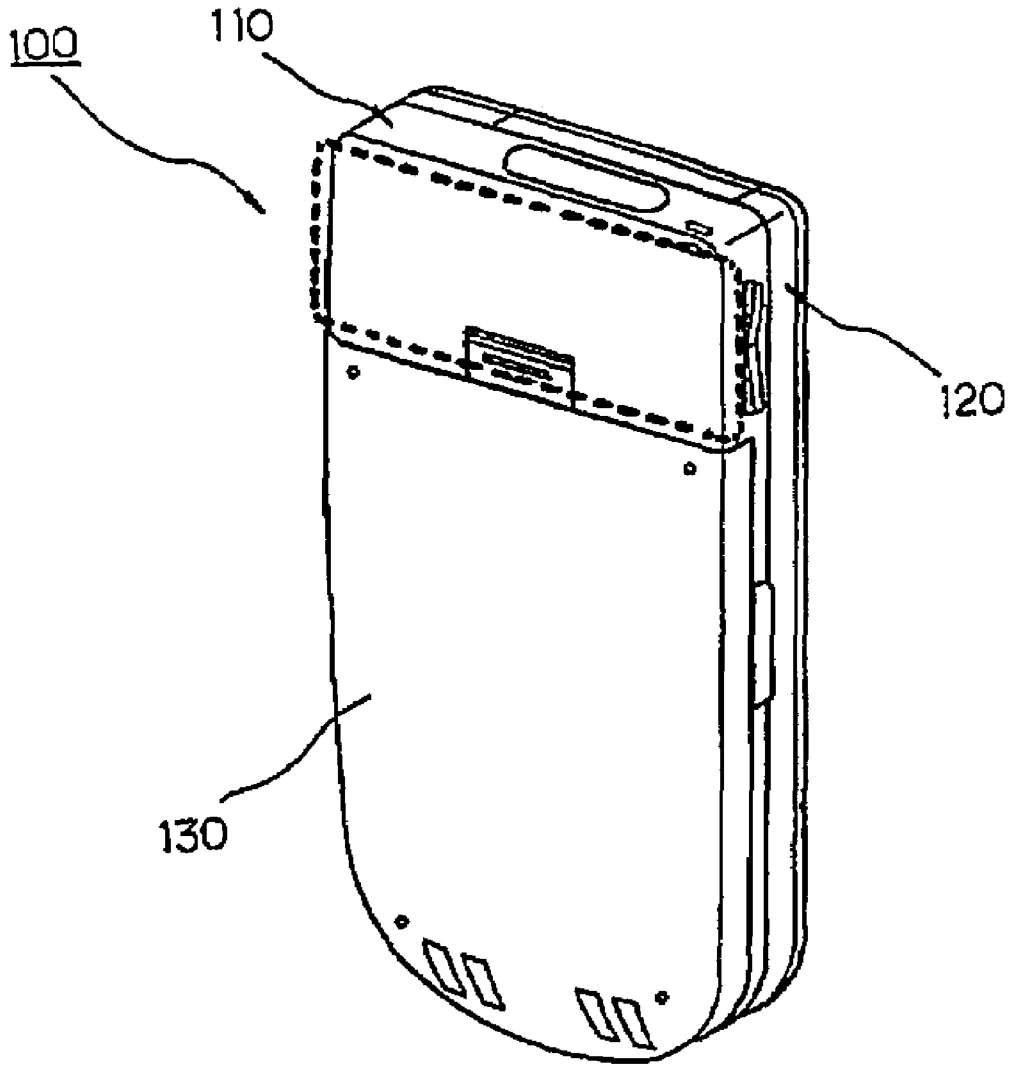
FIG.2 PRIOR ART
FIG. 2 is a rear perspective view of a conventional portable wireless terminal and shows the position of a radiator of a built-in antenna.
Figure 3:
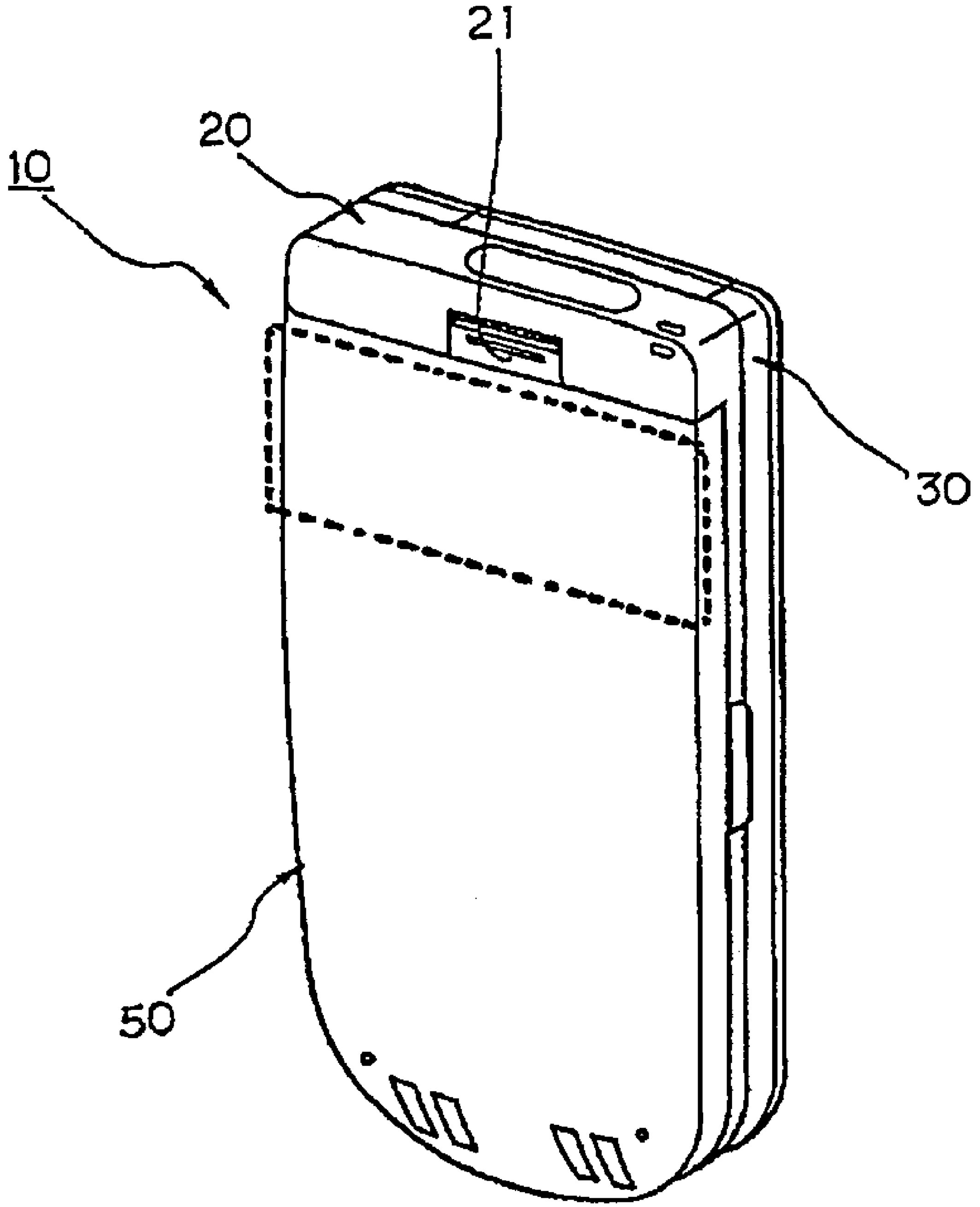
FIG. 3 is a rear perspective view of a portable wireless terminal according to the present invention and shows the position of a radiator of a built-in antenna.

FIG. 3 is a rear perspective view of a portable wireless terminal including a main body and a slide body, slidable on the main body, and it shows the position of a radiator of a built-in antenna apparatus according to the present invention. In the description of the above portable wireless terminal, a variety of elements installed on a front side of the terminal will be omitted since they are the same as those of the aforementioned prior art terminal.

Referring to FIG. 3, a power supply means (e.g., a battery pack 50) is detachably installed on a rear surface of the terminal by a locker 21. The battery pack 50 has an increased volume, compared with that in the conventional terminal, so as to secure an installation space of a built-in antenna into a main body 40.

A radiator (see element 54 of FIG. 4) according to the present invention is installed inside the battery pack 50. In more detail, the radiator is installed inside upper and lower case frames (see elements 51 and 52 of FIG. 4) constituting the battery pack 50, and its position may correspond to a portion expressed as a dotted line in FIG. 3.

Figure 4:
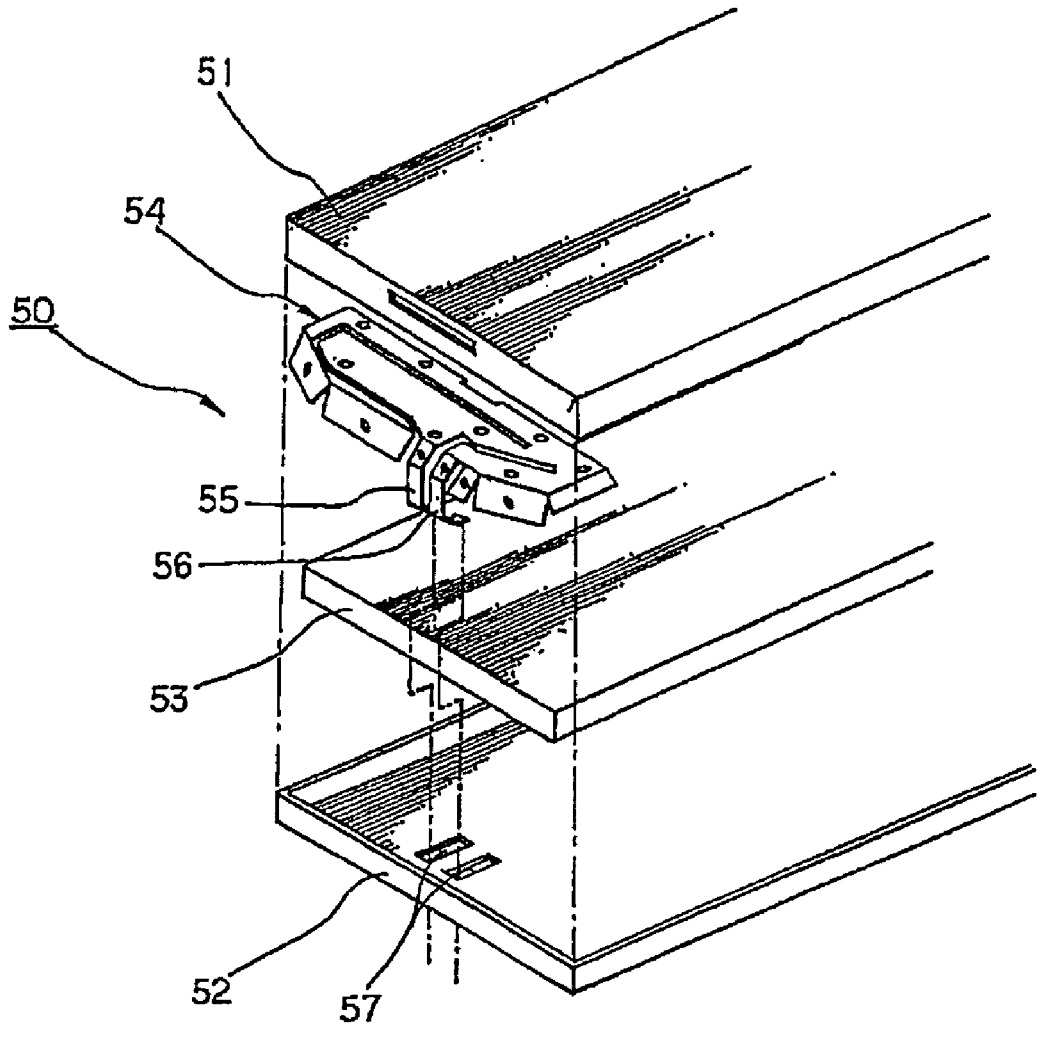
FIG. 4 is a disassembled perspective view of a battery pack to which a built-in antenna according to the present invention is applied.
Figure 5:
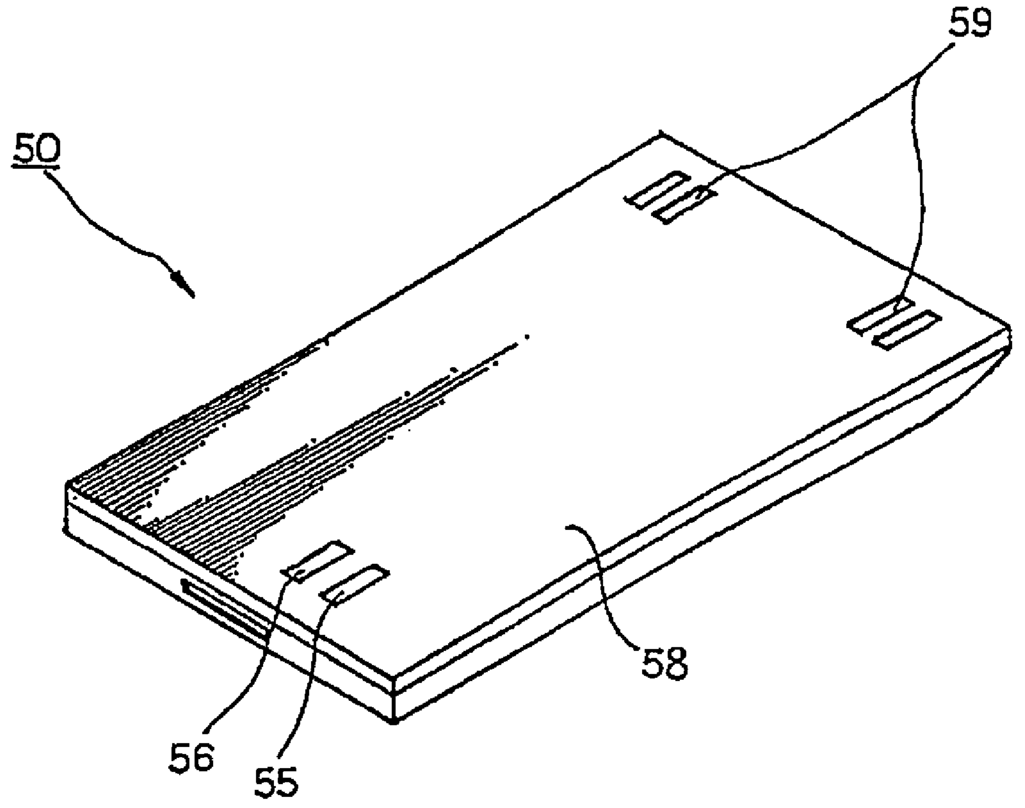
FIG. 5 is a rear perspective view of the battery pack shown in FIG. 4 as assembled.

FIG. 4 is a disassembled perspective view of the battery pack to which a built-in antenna according to the present invention is applied, and FIG. 5 is a rear perspective view of the battery pack shown in FIG. 4 as assembled.

Referring to FIGS. 4 and 5, the battery pack includes an upper case frame 51, and a lower case frame 52 corresponding in shape to the upper case frame 51 and establishing a predetermined installation space therein when coupled with the upper case frame 51. A power supply means (e.g., a battery cell 53) is received in the installation space between the upper case frame 51 and the lower case frame 52. The battery cell 53 is the power supply means of the wireless terminal 10, and supplies power when a plurality of terminals, exposed on a lower surface of the battery pack 50, are electrically connected with a plurality of power supply terminals (see element 23 of FIG. 6), exposed on an installation surface of the battery pack 50 of a main body of the wireless terminal 10. The battery cell 53 is rechargeable using a predetermined charging unit.

Again, referring to FIG. 4, the radiator 54, for example, a PIFA type radiator, is installed on the upper case frame 51. To electrically connect the radiator 54, a feed pin 55 and a ground pin 56 each having a predetermined length extend from the radiator. The feed pin 55 and the ground pin 56 are formed via a detour route around the battery cell 53 to align with penetration holes 57 formed at the lower case frame 52. Accordingly, if the upper and lower case frames 51 and 52 are coupled with each other by a thermal fusion, supersonic fusion or other similar means, the ends of the feed pin 55 and the ground pin 56 of the radiator 54 would pass through the penetration holes 57 of the lower case frame 52. As shown in FIG. 5, the ends of the feed pin 55 and the ground pin 56 are exposed on the rear surface of the battery pack 50.

The feed pin 55 and the ground pin 56 are not limited to the above constructions and may be modified. For example, a metal ground piece may be installed at each of the penetration holes 57 and the feed pin 55 and the ground pin 56 are electrically connected with an upper surface of each of the metal ground pieces.

The present invention uses a metallic outer surface of the battery cell 53 as ground means of the PIFA type radiator 54. Since the battery cell 53 has an aluminum housing, it is possible to use the metallic outer surface of the battery cell 53 as the ground means by electrically connecting the ground pin 56 of the radiator 54 with the outer surface of the battery cell 53. However, the present invention is not limited to the above construction and may be modified to a construction in which the ground pin 56 of the radiator 54 is concurrently connected to a ground pattern formed on a main board (see element 24 of FIG. 7).

Figure 6:
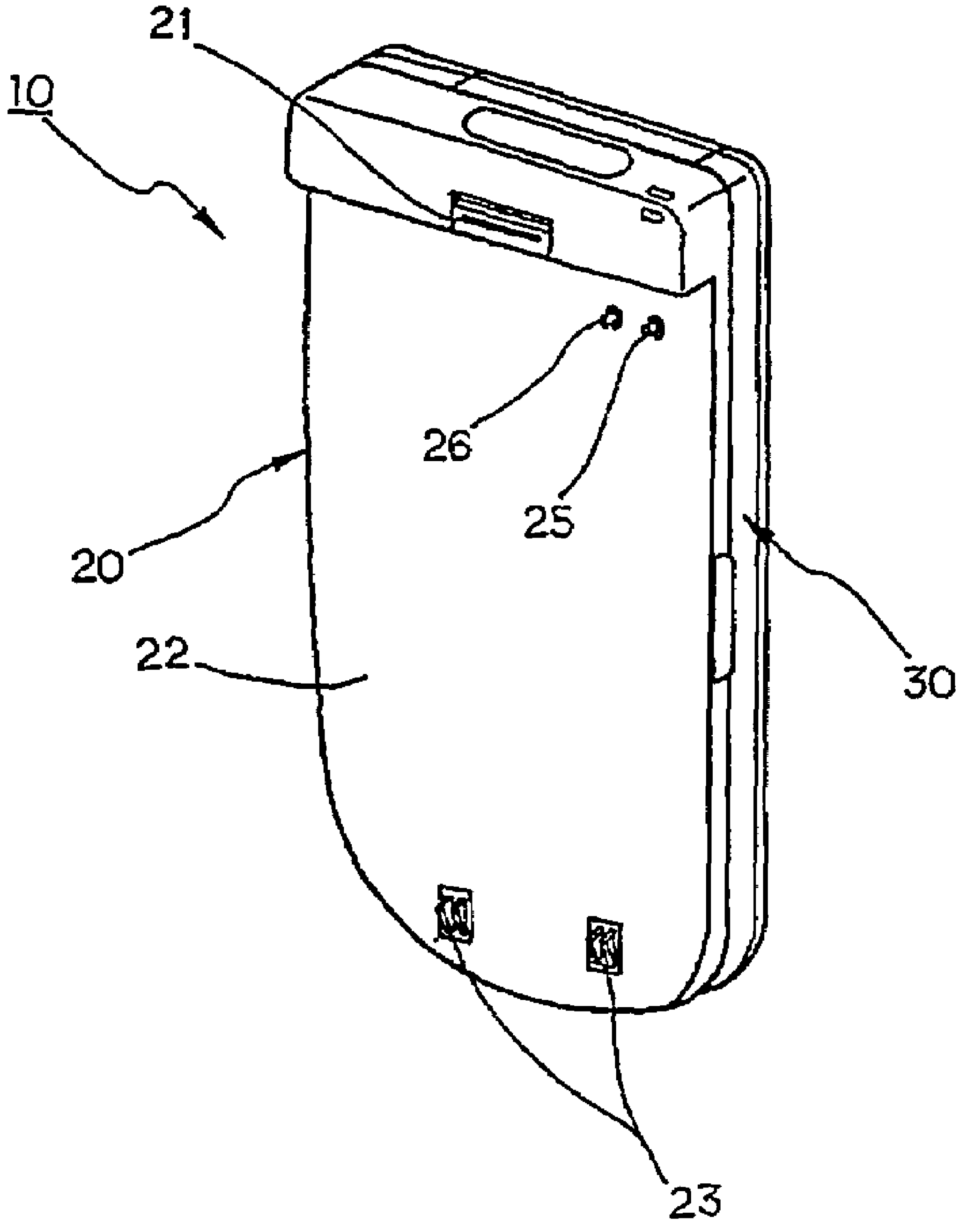
FIG. 6 is a rear perspective view of a wireless terminal according to the present invention and shows an installation part to which a battery pack according to the present invention is applied.

FIG. 6 is a rear perspective view of a wireless terminal according to the present invention. As shown in FIG. 6, power supply terminals 23, which are electrically connected with the terminals (see element 59 of FIG. 5) of the battery cell 53 of the battery pack 50, protrude from a lower portion of the rear surface of the main body 20. In addition, a protruding feed connector 25 and a ground connector 26 are mounted on an upper installation surface 22 of the main body 20 of the battery pack 50 such that the feed connector 25 and the ground connector 26 are electrically connected with the exposed feed pin 55 and ground pin 56 while the battery pack 50 is installed. The connectors 25 and 26 may be a spring connector having a ball plunger well known to those skilled in the art or may be embodied in a similar structure to the aforementioned power supply terminals. The present invention may employ various connecting means that can be connected to the exposed feed pin 55 and ground pin 56 of the battery pack 50.

Figure 7:
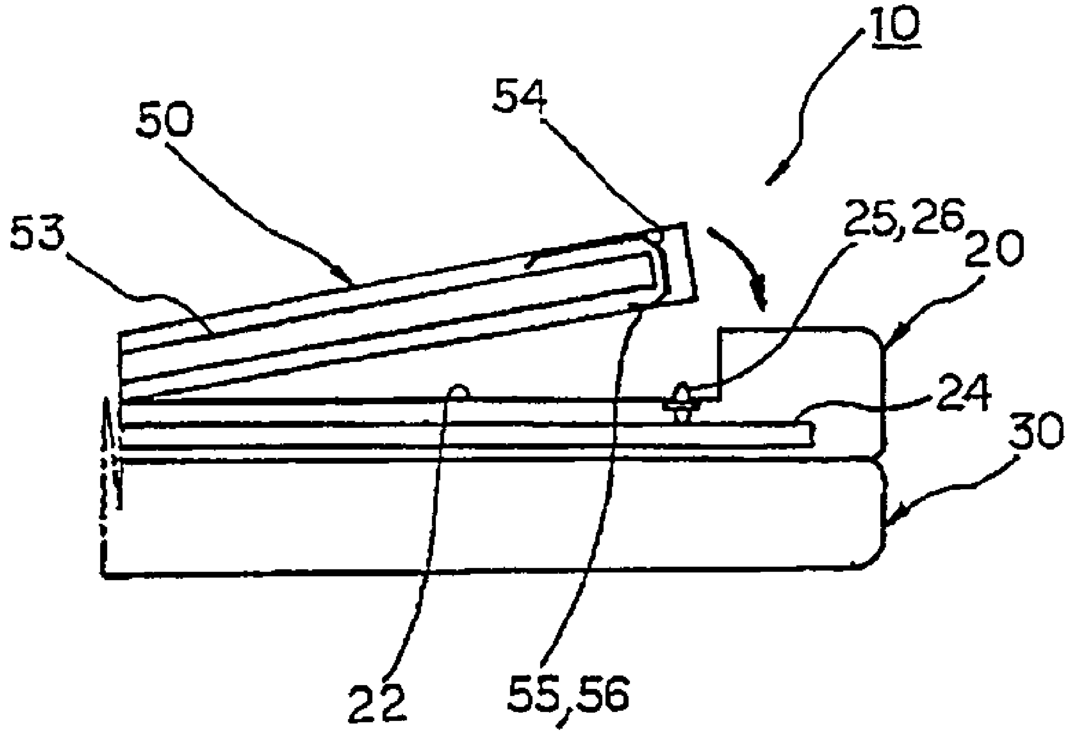
FIG. 7 is a schematic view illustrating a coupling of a radiator when a battery pack according to the present invention is applied to a wireless terminal.

FIG. 7 is a schematic view illustrating a coupling of a radiator when a battery pack according to the present invention is applied to a wireless terminal. As shown in FIG. 7, the feed connector 25 and the ground connector 26 are electrically connected with the main board 24 mounted on the main body 20. Although not shown in FIG. 7, the feed connector 26 is electrically connected with an RF connector of the main board 20, and the ground connector 26 is electrically connected with a ground of the main board 20. In the above construction, the ground of the main board 20 is designed to be electrically grounded to the outer surface of the battery cell 53 of the wireless terminal. Accordingly, when the ground pin 56 of the radiator 54 is connected with the ground connector 26, the ground pin 56 is electrically connected with the metallic outer surface of the battery cell 53. This causes the outer surface of the metallic battery cell 53 to be used as a ground surface with respect to the radiator 54. Although not shown in FIG. 7, the ground pin 56 of the radiator 54 may be directly electrically connected with the battery cell 53.

In the present invention, the outer surface of the battery cell is made of metallic material, but may be made of non-metallic material if a plate-type metal is attached on the outer surface of the battery cell. When the outer surface of the battery cell is made of non-metallic material, it is preferable that the plate type metal is attached furthest from the radiator.

Since the built-in antenna apparatus according to the present invention has a radiator which is installed not inside the main body but inside the battery pack, it permits a removal of an antenna mounting space from the main body, thereby contributing to a slim profile and a lightweight feature of the wireless terminal.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A portable wireless terminal provided with a main body having a main board, and a battery pack detachably mounted in the main body and used as power supply means for the wireless terminal, the battery pack comprising:

an upper case frame;

a lower case frame coupled with the upper case frame to provide a predetermined installation space therebetween;

a battery cell having a conductive outer surface fixed in the installation space; and a radiator fixed to an inner surface of the upper case frame, and having a feed pin and a ground pin that are exposed on the lower case frame along a route around the battery cell.

2. The portable wireless terminal of claim 1, wherein the feed pin and the ground pin are respectively electrically connected to a feed means and a ground means, mounted on the main board of the main body when the battery pack is installed in the wireless terminal.

3. The portable wireless terminal of claim 2, wherein the main board comprises a feed connector and a ground connector protruding on a battery pack mounting surface, the feed connector being electrically connected with an RF connector of the main board and the ground connector being electrically connected with a ground of the main board such that the feed connector and the ground connector are respectively electrically connected with the feed pin and the ground pin.

4. The portable wireless terminal of claim 3, wherein the ground connector is electrically grounded to the conductive outer surface of the battery cell.

5. The portable wireless terminal of claim 4, wherein the ground pin of the radiator is electrically connected with the conductive outer surface of the battery cell.

6. The portable wireless terminal of claim 5, wherein the battery cell further comprises a plate-type conductive metal attached on the outer surface of the battery cell.

7. The portable wireless terminal of claim 6, wherein the conductive metal is attached on a surface which is farthest from the radiator.

8. The portable wireless terminal of claim 5, wherein the battery cell has an outer surface made of a metal material.

9. A built-in antenna of a portable wireless terminal provided with a main body having a main board, and a battery pack detachably mounted in the main body and used as power supply means for the terminal, the battery pack comprising:

an upper case frame;

a lower case frame coupled with the upper case frame to provide a predetermined installation space therebetween;

a battery cell having a conductive outer surface fixed in the installation space; and a radiator fixed to an inner surface of the upper case frame, and having a feed pin and a ground pin that are exposed on the lower case frame along a route around the battery cell.

10. The built-in antenna of claim 9, wherein the feed pin and the ground pin are respectively electrically connected to a feed means and a ground means, mounted on the main board of the main body when the battery pack is installed in the wireless terminal.

11. The built-in antenna of claim 10, wherein the main board comprises a feed connector and a ground connector protruding on a battery pack mounting surface, the feed connector being electrically connected with an RF connector of the main board and the ground connector being electrically connected with a ground of the main board such that the feed connector and the ground connector are respectively electrically connected with the feed pin and the ground pin.

12. The built-in antenna of claim 11, wherein the ground connector is electrically grounded to the conductive outer surface of the battery cell.

13. The built-in antenna of claim 12, wherein the ground pin of the radiator is electrically connected with the conductive outer surface of the battery cell.

14. A battery pack for supplying power to a portable wireless terminal, the battery pack being detachably mounted to the terminal, comprising:

an upper case frame;

a lower case frame coupled with the upper case frame to provide. a predetermined installation space therebetween;

a battery cell having a conductive outer surface fixed in the installation space; and a radiator fixed to an inner surface of the upper case frame, and having a feed pin and a ground pin that are exposed on the lower case frame along a route around the battery cell.

* * * * *